United States Patent [19] Houserman

[11] Patent Number: 4,712,049

[45] Date of Patent: Dec. 8, 1987

[54] OPERATION COMPLETION DETECTION MEANS

[75] Inventor: Raymond L. Houserman, St. Louis, Mo.

[73] Assignee: Coin Acceptors, Inc., St. Louis, Mo.

[21] Appl. No.: 899,495

[22] Filed: Aug. 22, 1986

[51] Int. Cl.[4] .............................................. H02P 3/06

[52] U.S. Cl. .................................... 318/112; 318/103; 194/353; 221/129; 221/153; 221/258

[58] Field of Search ............... 318/111, 112, 101, 103; 194/267, 268, 273, 278, 279, 280, 353; 221/129, 153, 258; 340/825.35, 568; 307/241, 242; 133/4 A

[56] References Cited

U.S. PATENT DOCUMENTS

| | | | |
|---|---|---|---|
| 3,307,671 | 3/1967 | Shirley | 194/218 |
| 3,508,636 | 4/1970 | Shirley | 194/217 |
| 3,589,492 | 6/1971 | Shirley | 194/217 |
| 3,687,255 | 8/1972 | Johnson, II | 194/217 |
| 3,894,220 | 7/1975 | Levasseur | 194/218 X |
| 4,008,792 | 2/1977 | Levasseur et al. | 194/217 |
| 4,034,839 | 7/1977 | Lee | 194/218 |
| 4,105,867 | 8/1978 | Levasseur et al. | 194/216 X |
| 4,284,208 | 8/1981 | Levasseur | 221/129 |
| 4,458,187 | 7/1984 | Heiman | 221/129 X |
| 4,478,353 | 10/1984 | Levasseur | 194/218 X |
| 4,526,263 | 7/1985 | Levasseur | 194/218 |
| 4,604,557 | 8/1986 | Cowles | 221/129 X |

*Primary Examiner*—Bentsu Ro

*Attorney, Agent, or Firm*—Haverstock, Garrett & Roberts

[57] ABSTRACT

Operation completion detection circuitry for a vend system including a plurality of individually controllably operable motors for performing a given type of operation, comprising power leads, a vend control circuit portion operatively connected to complete a circuit across the power leads through a given motor from among the plurality of motors, a cam operated switch associated with each motor and connected in series circuit therewith, each of which switches includes a first pole and a second pole, connected in common, and a controllably movable switch contact which is normally in electrical contact with the first pole of the switch means and is responsive to operation of the motor with which such cam operated switch is associated to switchably cycle between such first and second poles during a complete operational cycle of the motor, and a detector circuit which includes a monitor portion thereof operatively connected in common circuit to all of the motors and their associated cam operated switches and in series circuit with each respective motor and its associated cam operated switch, which detector circuit is responsive to operation of the movable switch contact of any of the cam operated switches to produce and to provide to the vend control circuit portion a home detection signal when the motor associated with such cam operated switch has operated sufficiently to cause the movable switch contact of such switch to complete a movement cycle and to return to electrical contact with the first pole of such switch.

8 Claims, 6 Drawing Figures

OPERATION COMPLETION DETECTION MEANS

BACKGROUND OF THE INVENTION

The present invention relates to operation completion detection means for vending systems, especially for vending systems that include a plurality of individually actuatable vend delivery motors for vending a variety of different products.

Many existing vending systems have been designed to utilize controllably actuatable motors or other actuators to effect certain operations. By way of example, vend delivery motors may be employed to effect the vending under appropriate conditions of a product or products selected by a customer, coin payout motors may be employed to effect distribution of overdeposited credit amounts back to a customer, and other motors may be employed for other purposes related to the vending system operation, such as movement of a cup into which a liquid is to be dispensed into position or the controlled opening and closing of a dispensing valve. Vending systems that utilize such controllably actuatable motors generally require that each motor, when controllably actuated, thereafter remain energized to operate for some sufficiently long enough period that the particular operation associated therewith will be completed as a result of such motor operation. Such period may be referred to as an operation cycle. In most cases, the operation cycle is functionally related to the operation of the motor and can be readily determined by monitoring the shaft rotation of the motor during the period of motor energization. As a result, it has been found that, by monitoring the shaft rotation of the selected motor, it is possible to determine when the motor has operated sufficiently under normal circumstances to cause the particular operation associated therewith to be completed and to permit the motor to be de-energized.

Typically, during an operation cycle of a vend delivery motor a variety of different events must occur in proper sequence for a product delivery to occur. Such events often involve several mechanical movements, all or most of which are controlled either directly or indirectly by operation of the appropriate vend delivery motor. In many instances, mechanical or electromechanical devices, such as cams and cam operated switches, are mounted upon or are associated with the output shaft of such motor to effect such events in their proper sequence. However, as a consequence thereof, it is important that the motor be in a proper initial state at the time it is first actuated to ensure that the desired sequence of operations will actually occur in the proper sequence, especially since the mechanical movements of a vend delivery operation are often interdependent to some extent. In many instances, if a particular mechanical movement required in a vend delivery operation is not performed, subsequent mechanical movements in a sequence of operation may not be effective to cause a product to be delivered. Consequently, it is recognized that the de-energization of a vend delivery motor must generally be effected at such a time and in such a manner at the conclusion of a delivery cycle so that such motor will be in a proper initial state for a subsequent vend delivery operation.

It is well known that a cam on the output shaft of a motor may be utilized not only to control the various mechanical movements necessary to effect a particular operation, such as to provide a product to the customer, but also to provide indications that the ouput shaft of the motor has rotated to such an extent that normal product delivery should have occurred and/or that the motor is in a proper state such that de-energization of the motor will leave it in a proper initial state for subsequent vend operations. As has long been recognized, a motor can therefore be provided with a cam on its output shaft, which cam may control the position of a cam operated switch that is wired in a circuit that is operatively connected to or monitored by the vend control means of the vending system.

Many known vending systems have made use of such types of circuits wherein cam operated switches form no part of the motor driving circuit but are disposed in separate sensing circuits wherein their operation is detectable by the vend control means of the vending system to effect other operations related to the vending operation and/or to cause the motor driving such cam to be de-energized. For example, U.S. Pat. Nos. 3,307,671; 3,508,636; 3,589,492; 3,687,255; 4,008,792; and 4,105,867, all of which are assigned to a subsidiary of Applicant's assignee, all disclose the use of a coin payout motor which has a cam operated switch associated therewith that is operable to effect a change in status of a separate sensing circuit, which change in status is detectable by the vend control means of the vending system and provides an indication thereto that the payout motor has operated sufficiently such that further operations relative to coin payback operations should be taken. In addition, U.S. Pat. Nos. 3,894,220 and 4,008,972, both of which are likewise assigned to the same subsidiary of Applicant's assignee, disclose the use of cam operated switches associated with vend motors to effect changes in status of separate sensing circuits, which changes in status are detectable by the vend control means of the vending systems to effect de-energization of the vend motors under appropriate conditions.

It will be appreciated that, as the number of individually selectable and actuatable motors for performing a given type of operation increases, so does the number of cam operated switches associated therewith. Quite obviously, if a separate sensing circuit were utilized for each cam operated switch, a large amount of replicative circuitry would be required for vending systems that employ a plurality of vend motors, especially for certain vending systems that now employ thirty or sixty or even more vend motors. To avoid the necessity of providing such replicative circuitry, many known systems that employ a plurality of vend motors, such as those disclosed in U.S. Pat. Nos. 3,894,220 and 4,008,972, use a daisy chain wiring technique with the plurality of cam operated switches. While such types of arrangements have generally been found to achieve desired results, they do have certain disadvantages associated with them, as well. A separate sensing circuit, with all the wiring attendant thereto, is still required for such systems, and, because of the daisy chaining required, the failure of a single motor, such as by hanging up partway through its operation cycle, may be sufficient in some circumstances to totally disable the sensing circuit and to thereby render the entire vending system inoperable.

Other known systems have also been developed wherein the cam operated switches associated with the particular motors have been so utilized that, when the movable switch contact of the cam operated switch means associated with a given motor is in one position, such cam operated switch comprises a portion of a motor hold circuit to ensure that, under certain conditions, once motor operation has been initiated by some means, motor energization will be continued for some period of time as determined by the controlled switching action of the associated cam operated switch. For example, U.S. Pat. No. 3,307,671 discloses the use of a cam operated switch associated with a refund motor in a motor hold circuit for such motor, the purpose of which is to enable the motor to complete an operating cycle and stop at a predetermined position. As the number of motors increases in a vending system, however, so does the amount of replicative circuitry required to provide motor hold circuitry for each motor. U.S. Pat. No. 4,034,839, assigned to a subsidiary of Applicant's assignee, discloses one vending system in which a plurality of cam operated switches are employed in a daisy chain arrangement in motor hold circuitry to ensure that a given motor will remain energized to complete an operation even if the motor selection switch which was required to be actuated to initiate motor energization is de-actuated prior to completion of motor operation. U.S. Pat. No. 4,478,353, assigned to the same subsidiary of Applicant's assignee, discloses a different system in which cam operated switches are employed with sold out switches associated with the vend motors to establish motor hold circuits to maintain energization of a given motor so that it can complete its operation cycle even if the product being vended is the last product and its delivery would normally cause a transfer of a sold out switch to prevent motor energization. U.S. Pat. No. 4,526,263, also assigned to the same subsidiary of Applicant's assignee, discloses a system in which a plurality of cam operated switches are so connected that the movable contact of each such switch in one position comprises a portion of a motor hold circuit for the motor with which it is associated and in another position comprises a portion of a separate sensing circuit similar in many respects to the types disclosed in U.S. Pat. Nos. 3,894,220 and 4,008,792.

To avoid the disadvantages associated with large amounts of replicative circuitry and/or daisy chaining arrangements of the cam operated switches, other systems have been developed wherein a cam operated switch associated with a given motor is connected in a series circuit with an impedance element, such as a resistor or capacitor, across, i.e., in parallel circuit with, such given motor. U.S. Pat. No. 4,458,187 discloses various embodiments of such types of systems. While such types of systems avoid some of the disadvantages attendant to daisy chain arrangements of cam operated switches and limit to some extent the amount of replicative circuitry that is required when a plurality of motors and associated cam operated switches are employed, because of the parallel circuitry asssociated with each motor, they still require fairly substantial numbers of the various components that are included in the circuit portions parallel to each of the motors and they may also require greater power, especially upon initialization of energization, to drive the selected motor than would be the case if such replicative circuitry for each motor were not present or required. Furthermore, with some types of such systems that include such parallel circuitry and employ AC signals to sense the status of the motors, several of which are disclosed in U.S. Pat. No. 4,458,187, additional circuitry, with the consequent additional costs that are associated therewith, may be required. By way of example, with some of the known embodiments that employ AC signals for sensing motor status, additional AC oscillators and band pass filters are required in addition to a plurality of capacitors for connection in series circuit with the cam operated switches across the motors and a relatively sophisticated detection circuit.

SUMMARY OF THE INVENTION

The present invention avoids many of the disadvantages of the various vend systems that have been discussed hereinbefore, and does so by eliminating the need for separate sensing circuits for each motor, for daisy chain harnesses in sensing circuits, and for replicative circuitry employing a plurality of impedance elements and, in some instances, additional frequency oscillators and/or band pass filters. With the present invention, only a single detection circuit means need be employed and the amount of replicative circuitry required for a plurality of motors can be greatly minimized.

In its presently preferred form, the subject invention includes a vend control means operatively connected to control operation of one or more of a plurality of individually controllably actuatable motors operable for performing a given type of operation. Each motor has a cam operated switch means associated therewith and connected in series circuit with the motor, which switch means includes a first pole and a second pole, connected in common, and a controllably movable switch contact which is normally in electrical contact with its first pole and is responsive to operation of the motor with which such cam operated switch is associated to switchably cycle between such first and second poles during a complete operational cycle of the motor. A detector circuit means is provided with a monitor portion thereof operatively connected in common circuit to all of the motors and their associated cam operated switch means and in series circuit with each respective motor and its associated cam operated switch means, which detector circuit means is responsive to operation of the movable switch contact of any of the cam operated switch means to produce and to provide to the vend control means a home detection signal when the motor associated with such cam operated switch means has operated sufficiently to cause the movable switch contact to complete a movement cycle and to return to electrical contact with the first pole.

In operation, the vend control means, upon a determination that a sufficient amount of credit has been deposited by a customer for the item selection made by him, effects establishment of a power drive circuit to a given motor and its associated cam operated switch means to thereby complete a motor driving circuit through the given motor, its associated cam operated switch means, and the monitor portion of the detector circuit means. The motor driving circuit for such given motor initially comprises a first power circuit through the given motor and through the movable contact and the first pole of the cam operated switch means associated therewith. The completion of such motor driving circuit initiates operation of and the commencement of an operational cycle of such given motor. The operation of such given motor thereafter effects switchable movement of the movable switch contact of the associated cam operated switch means from its first pole to its second pole to break the first power circuit and to establish a second power circuit through such given motor and through the movable contact and second pole of the associated cam operated switch means, upon which occurrence the motor driving circuit will then comprise the second power circuit. Further operation of the given motor effects switchable movement of the movable switch contact from the second pole back to the first pole to break the second power circuit and to re-establish the first power circuit through such given motor and through the movable contact and first pole of the cam operated switch means associated therewith, whereupon the motor driving circuit again comprises the first power circuit. The switchable movement of the movable contact from its second pole to its first pole momentarily interrupts the motor driving circuit through the given motor and its associated cam operated switch means. This momentary interruption upon the return movement of the movable contact from the second pole to the first pole is detectable by the detector circuit means, which detector circuit means produces and provides to the vend control means a home detection signal. The vend control means is thereupon responsive to such home detection signal to effect disestablishment of the power drive circuit to the operating motor and its associated cam operated switch means, as a consequence of which such motor will thereupon cease to operate.

In light of what has been discussed hereinabove, it will be appreciated that a principal object of the present invention is to provide an improved operation completion detection means.

Another object of the present invention is to provide an operation completion detection means that minimizes the amount of replicative circuitry and circuit elements required.

A further object of the present invention is to provide a vending system with a motor operation completion means that alleviates the need to provide high initial current to start a motor operation.

An additional object of the present invention is to provide an operation completion detection means that eliminates any need for daisy chain harnessing of cam operated switches for motor operation completion detection purposes.

A still further object of the present invention is to provide an operation completion detection means which has a high immunity to circuit noise.

These and other objects and advantages of the present invention will become apparent after considering the following detailed specification in conjunction with the accompanying drawings, wherein:

DESCRIPTION OF THE PREFERRED EMBODIMENT

Figure 1:
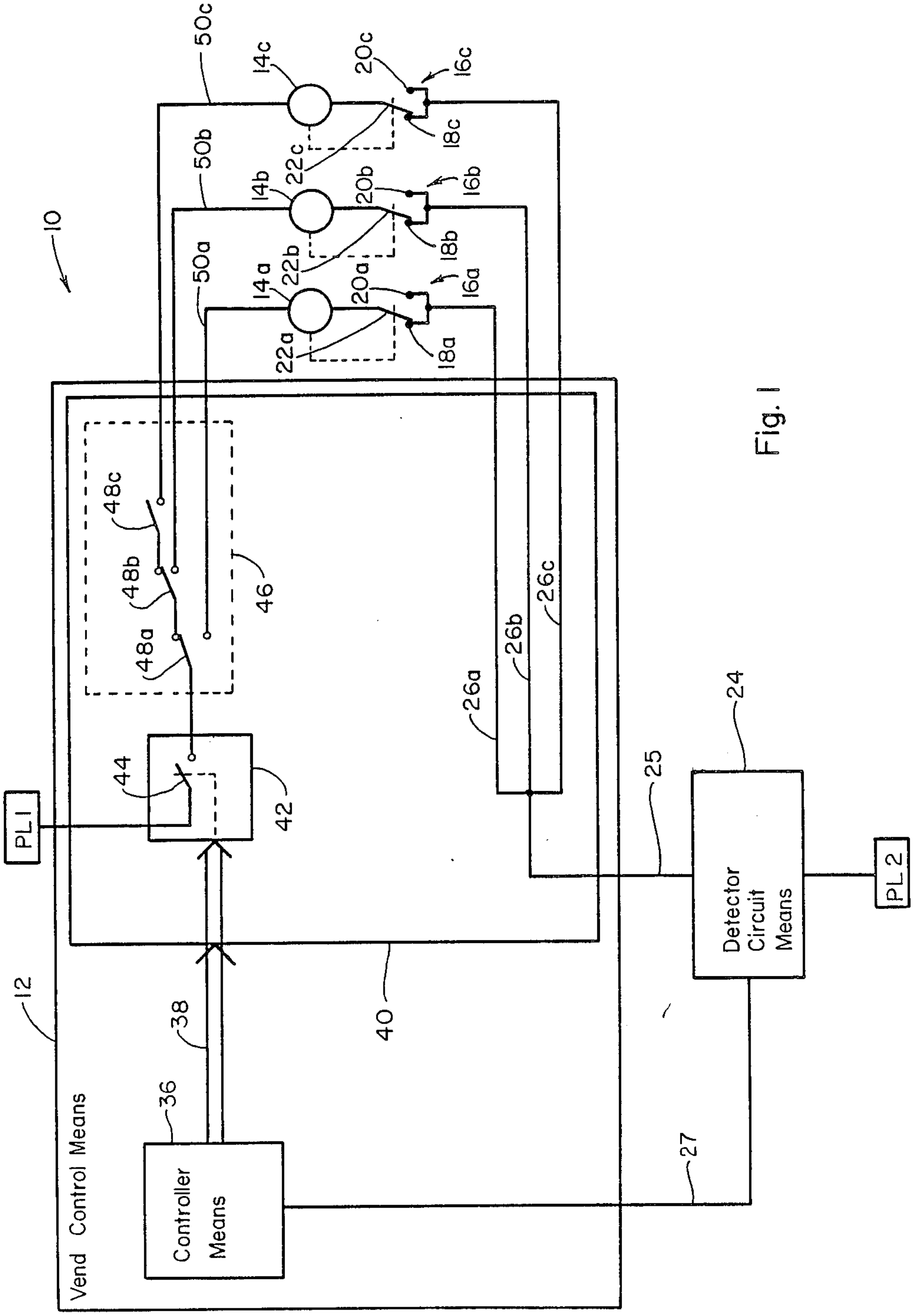
FIG. 1 is a block diagram of one embodiment of the operation completion detection means of the present invention as incorporated into a single price vending system.

Referring now to the drawings more particularly by reference numbers, wherein like numbers refer to like components, number 10 in FIG. 1 identifies a vend system employing operation completion detection circuitry in accordance with the present invention. The vend system depicted in FIG. 1 is a single price vend system that includes power leads PL1 and PL2 which are operatively connected and/or connectable to a plurality of individually controllably actuatable motors **14*a*–14*c* through vend control means 12 and detector circuit means 24. Each motor 14*a*–14*c* has associated therewith a respective cam operated switch means 16*a*–16*c* connected in series circuit with the motor, each of which switch means 16*a*–16*c* includes a respective first pole 18*a*–18*c* and a respective second pole 20*a*–20*c*, which first and second poles are connected in common, and a respective controllably movable switch contact 22*a*–22*c* which is normally in electrical contact with its respective first pole 18*a*–18*c*** and is responsive to operation of the motor with which such cam operated switch means is associated to switchably cycle between the first pole of its respective switch means and the second pole thereof during a complete operational cycle of the motor.

Detector circuit means 24 is connected between vend control means 12 and PL2 such that a monitor portion thereof is operatively connected in common circuit to all of motors **14*a*–14*c* and their associated cam operated switch means 16*a*–16*c* via common lead 25 and in series circuit with each respective motor and its associated cam operated switch means via lead 25 and respective leads 26*a*–26*c*. As will be apparent from that which follows, such detector circuit means is responsive to the momentary circuit interruption effected by movement of a respective movable switch contact 22*a*–22*c* from its respective associated second pole 20*a*–20*c* to its respective associated first pole 18*a*–18*c* to produce and provide a home detection signal to vend control means 12 via lead 27**.

The vend control means 12 as depicted in FIG. 1 may be considered to include a controller means 36 which functions to produce control information signals, including vend authorization signals, over data/control path 38 to a motor control means 40. As will be apparent to those skilled in the art, such controller means 36 may take many forms, and many known controller means could be readily employed in the system of FIG. 1. Motor control means 40 is shown as including a gating means 42 connected to receive a vend authorization signal from controller means 36, which gating means is operable, as symbolically illustrated by switch element 44, to effect an electrical communication from power lead PL1 to selection means 46 and then through an actuated selection switch **48*a*–48*c* of selection means 46 to the respective motor 14*a*–14*c* associated with the actuated selection switch 48*a*–48*c* via a respective lead 50*a*–50*c***.

In operation, when a credit entry at least equal to the vend price is deposited by the customer and one of the selection switches **48*a*–48*c* of selection means 46 is actuated, as for example, switch 48*a*, gating means 42 operates in response to a vend authorization signal from controller means 36 to establish a power drive circuit to motor 14a and its associated cam operated switch means 16a to thereby complete a motor driving circuit from power lead PL1 through such motor, its associated cam operated switch means, and detector circuit means 24 to power lead PL2. Such motor driving circuit initially comprises a first power circuit through the motor 14a and through the movable contact 22a and the first pole 18a of cam operated switch means 16a. The completion of such motor driving circuit initiates operation of and the commencement of an operational cycle of motor 14a. The operation of such motor thereafter effects switchable movement of the movable switch contact 22a of the cam operated switch means 16a from its first pole 18a to its second pole 20a to break the first power circuit through the motor and to establish a second power circuit through such motor 14a and through the movable contact 22a and second pole 20a of the associated cam operated switch means 16a, upon which occurrence the motor driving circuit then comprises the second power circuit. Further operation of motor 14a thereafter effects switchable movement of the movable switch contact 22a from the second pole 20a back to the first pole 18a to break the second power circuit and to re-establish the first power circuit through such given motor 14a and through the movable contact 22a and first pole 18a of the cam operated switch means 16a** associated therewith, whereupon the motor driving circuit again comprises the first power circuit.

It will be appreciated that the cam operated switch means employed with the present invention are preferably selected to be of a "snap-action" type to ensure that the movable contacts will not become hung up between the first and second poles of the switch means, thereby interrupting the motor drive circuit for an extended period and causing the motor to cease operation. So long as the motors and cam operated switch means are so matched with one another that the movable contact of the cam operated switch means will be carried from one pole to the other pole of such switch means with only a momentary interruption of power to the motor, the motor and its associated cam operated switch means should operate adequately and in the manner intended with respect to the present invention.

In light of the foregoing, it will thus be apparent that the movement of the movable contact 22a from its second pole 20a to its first pole 18a during the operation cycle of motor 14a effects an interruption in the motor driving circuit through such motor and its associated cam operated switch 16a, but only a momentary interruption. Such momentary interruption upon the movement of the movable contact 22a from the second pole 20a to the first pole 18a is detectable by detector circuit means 24, which means is responsive thereto to produce a home detection signal on lead 27.

Controller means 36 of vend control means 12 is operatively connected to receive such home detection signal and, in response thereto, to effect disestablishment of the power drive circuit to motor 14a and its associated cam operated switch means 16a, such as by causing switch element 44 of gating means 42 to open. As a consequence of such disestablishment of the power drive circuit thereto motor 14a will then cease to operate and the movable contact 22a will remain in contact with first pole 18a, pending re-energization of such motor during a subsequent vend operation.

From what has been discussed hereinabove, it will be readily understood that the other motors and their respective cam operated switch means operate in similar manner to that already described with respect to motor 14a and its associated cam operated switch means 16a. Accordingly, the operation of such other motors and cam operated switches will be readily understood by those skilled in the art without need of further explanation.

Figure 2:
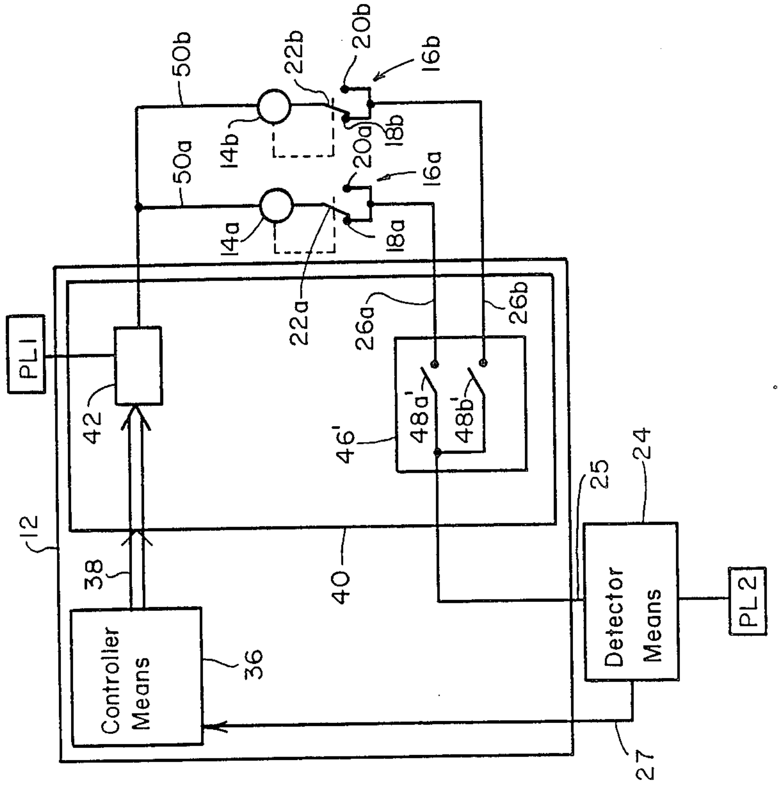
FIG. 2 is a block diagram of another embodiment of the present invention as incorporated into a different single price vending system.

Turning next to FIG. 2, it will be readily apparent that such figure depicts another single price vend system, similar in many respects to that of FIG. 1, but employing a differently constructed selection means 46' connected at a different location in the power drive circuit to the motors 14a–14b. Such differences in construction and circuit connection are readily apparent from a comparison of FIGS. 1 and 2 and will be readily understood by those skilled in the art. As is the case with the system of FIG. 1, no power drive circuit to a motor 14a–14b of the system of FIG. 2 will be established until both a vend authorization signal is provided to gating means 42 to effect the operation thereof and one of the selection switches 48a' or 48b' is actuated. At such time, a power drive circuit will then be completed to the motor associated with the actuated selection switch, and operation of such motor and of the operation completion detection circuitry will thereafter proceed in the manner described with respect to the system of FIG. 1.

Figure 3:
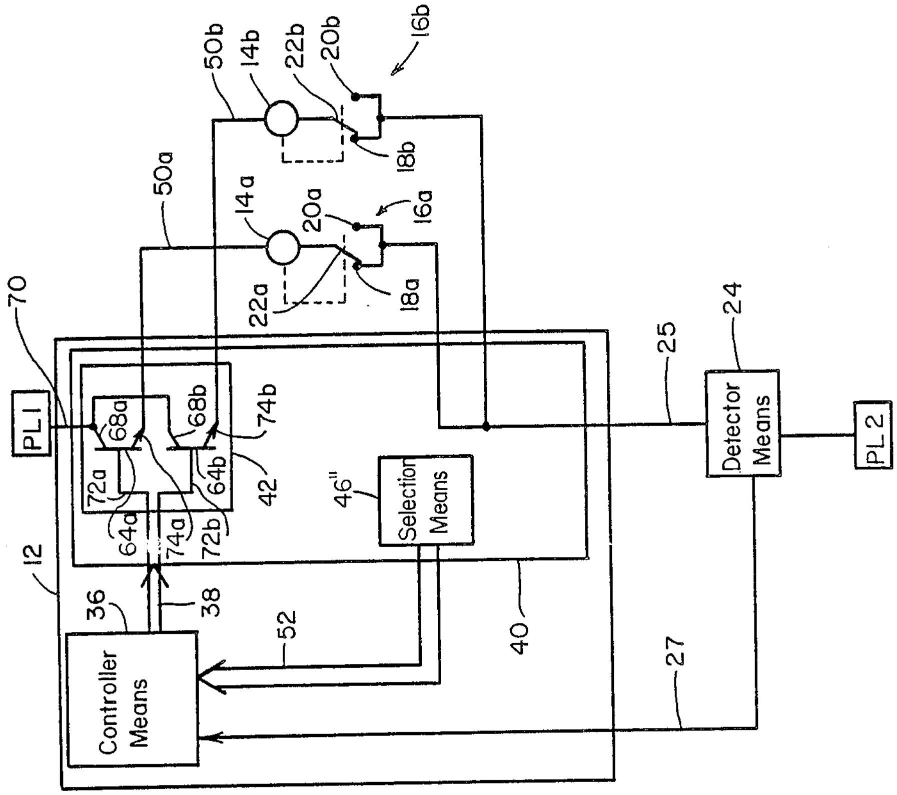
FIG. 3 is a block diagram of a further embodiment as incorporated into a vending system capable of vending different products at different prices.

FIG. 3 depicts a vend system capable of vending different products at different vend prices. Such system is similar in many respects to the systems of FIGS. 1 and 2, but in the FIG. 3 embodiment selection means 46", which may take many forms, is connected via a data/control path 52 to controller means 36 such that, when a vend selection is made by operation of the selection means 46" selection information is provided to controller means 36, as a consequence of which a vend price is established for the particular vend selection made. If the customer has deposited a sufficient amount of credit for the particular vend selection made, an appropriate vend authorization signal will be provided by controller means 36 via data/control path 38 to gating means 42 of motor control means 40. In the embodiment of FIG. 3, gating means 42 is depicted including NPN transistors 64a and 64b, which transistors are so connected that their collectors 68a and 68b are tied together and connected via lead 70 to power lead PL1, their bases 72a and 72b are operatively connected to receive different respective vend authorization signals produced by controller means 36 and provided over data/control path 38, and their emitters 74a and 74b are operatively connected to vend motors 14a and 14b, respectively. When a sufficient amount of credit has been entered for a particular vend selection, a vend authorization signal is provided to the base of the appropriate transistor to thereby gate such transistor ON and thus complete a power drive circuit from power leads PL1 and PL2 to the particular vend motor 14a or 14b associated with the vend selection made. The energized motor and the operation completion detection means of the system of FIG. 3 will thereafter operate in the fashion previously described with respect to the system of FIG. 1.

Figure 4:
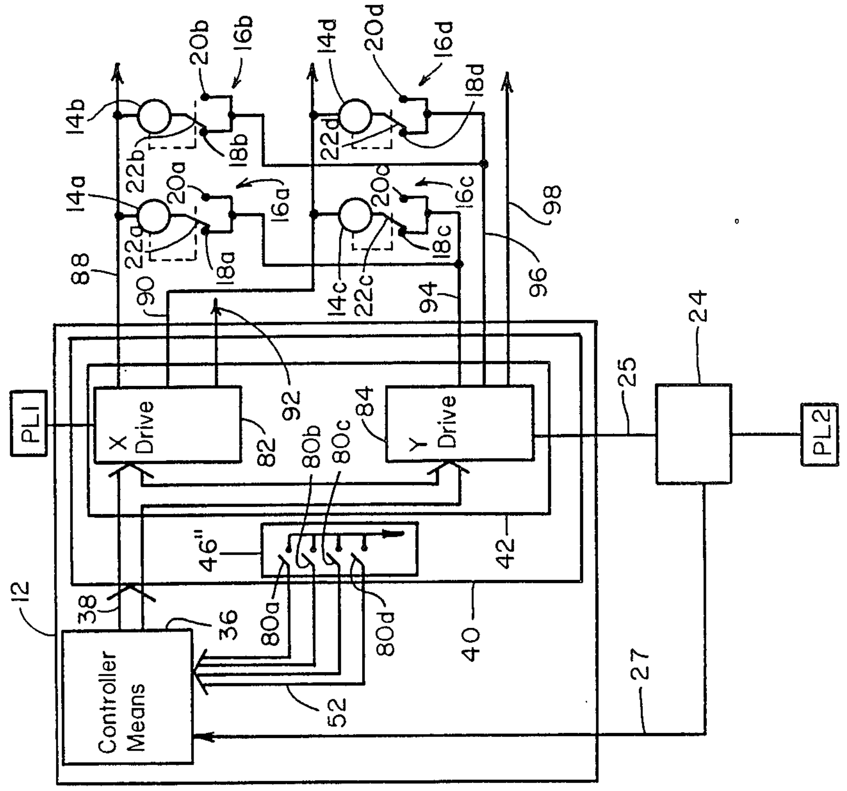
FIG. 4 is a block diagram of an embodiment as incorporated into a multi-price vending system that utilizes X,Y motor matrix drives.

It will be understood by those skilled in the art that many different types of selection means and gating means may be employed with the present invention. FIG. 4 depicts another multi-price vend system that employs operation detection completion means according to the present invention, but wherein the selection means 46" is constructed to include a plurality of switches 80*a*–80*d*, each of which has one side tied to ground and the other side operatively connected via data/control path 52 to controller means 36 such that actuation of any selection switch will cause a corresponding vend selection signal to be provided to controller means 36 to establish a vend price for the particular vend selection made. If an amount of credit at least equal to the established vend price has been entered into the system by the customer, controller means 36 will then produce an appropriate signal or signals over data/control path 38 to cause motor control means 40 to effect completion of a power drive circuit from power leads PL1 and PL2 to the appropriate vend motor 14*a*–14*d* associated with the vend selection made. It will be appreciated that, in the FIG. 4 system embodiment, motors 14*a*–14*d* are connected in a matrix format and gating means 42 includes a motor matrix control means that corresponds generally to the motor matrix control means disclosed in U.S. Pat. No. 4,284,208, which patent is assigned to a subsidiary of Applicant's assignee. In accordance with the teachings of such noted patent, controller means 36 provides over data/control path 38, when a vend authorization condition arises, X,Y drive information to X drive 82 and Y drive 84, which drives operate in response to such drive information to effect the operative communication of PL1 through X drive 82 to an appropriate one of the X drive leads 88–92 and the operative communication of power lead PL2 through detector circuit means 24 and Y drive 84 to an appropriate one of the Y drive leads 94–98, as a consequence of which a power drive circuit is established from the power leads to the particular motor 14*a*–14*d* corresponding to the vend selection made.

In operation, if selection switch 80*a* is actuated and an amount of credit at least equal to the vend price for the particular product associated with such selection switch has been entered by the customer, controller means 36 will provide X,Y drive information over data/control path 38 to X drive 82 and Y drive 84. In response thereto, X drive 82 will gate power lead PL1 to X drive output 88 and Y drive 84 will gate lead 25 to Y drive lead 94, as a consequence of which a motor drive circuit will be established from X drive lead 88 through motor 14*a* and cam operated switch means 16*a* to Y drive lead 94. Once motor 14*a* has been energized, such motor and the operation completion means will then operate in a manner similar to that previously described with respect to the system of FIG. 1 so as to produce a home detection signal on lead 27. Controller means 36 will respond to such home detection signal and cease production of the X,Y drive information on data/control path 38, as a consequence of which both the gating of power lead PL1 to X drive lead 88 and the gating of lead 25 to Y drive lead 94 will be terminated.

Figure 5:
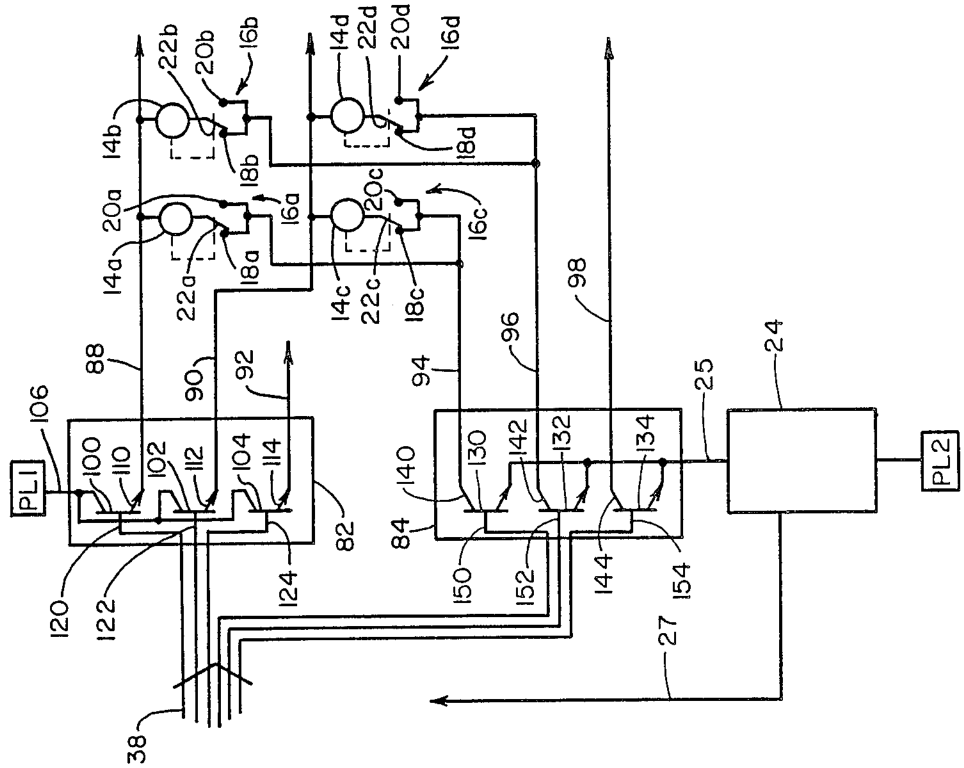
FIG. 5 is a partial circuit diagram depicting in greater detail one possible construction of the X and Y drives depicted in FIG. 4.

Those skilled in the art will recognize that the selection means and the X and Y drives employed in various embodiments may take many forms. By way of example, the selection means could, in addition to the forms described hereinbefore, also take the form of a numeric keyboard requiring entry therefrom of one or more numbers to identify a particular product to be vended and the vend motor associated therewith. The X and Y drives may similarly take many forms, including the particular form depicted in FIG. 5. In FIG. 5, X drive 82 is shown including a plurality of NPN transistors 100–104, all of which have their collectors tied together and connected via lead 106 to power lead PL1. The emitters 110–114 of transistors 100–104 are connected, respectively, to X drive leads 88–92, and the bases 120–124 of such transistors are connected to receive respective X drive signals provided from controller means 36 over data/control path 38. In similar fashion, Y drive 84 is shown including a plurality of NPN transistors 130–134, all of which have their emitters tied together and connected via lead 25 and detector circuit means 24 to power lead PL2. The collectors 140–144 of such transistors are connected, respectively, to Y drive leads 94–98, and the bases 150–154 thereof are connected to receive respective Y drive signals provided from controller means 36 over data/control path 38. When an X drive signal is provided from controller means 36 and applied to base 120 of transistor 100 and a Y drive signal is provided from control means 36 and applied to base 150 of transistor 130, both of such transistors are gated ON to establish a power drive circuit to motor 14*a*, such as has been discussed previously with respect to FIG. 4, as will be readily understood by those skilled in the art, especially after a review of noted U.S. Pat. No. 4,284,208.

Figure 6:
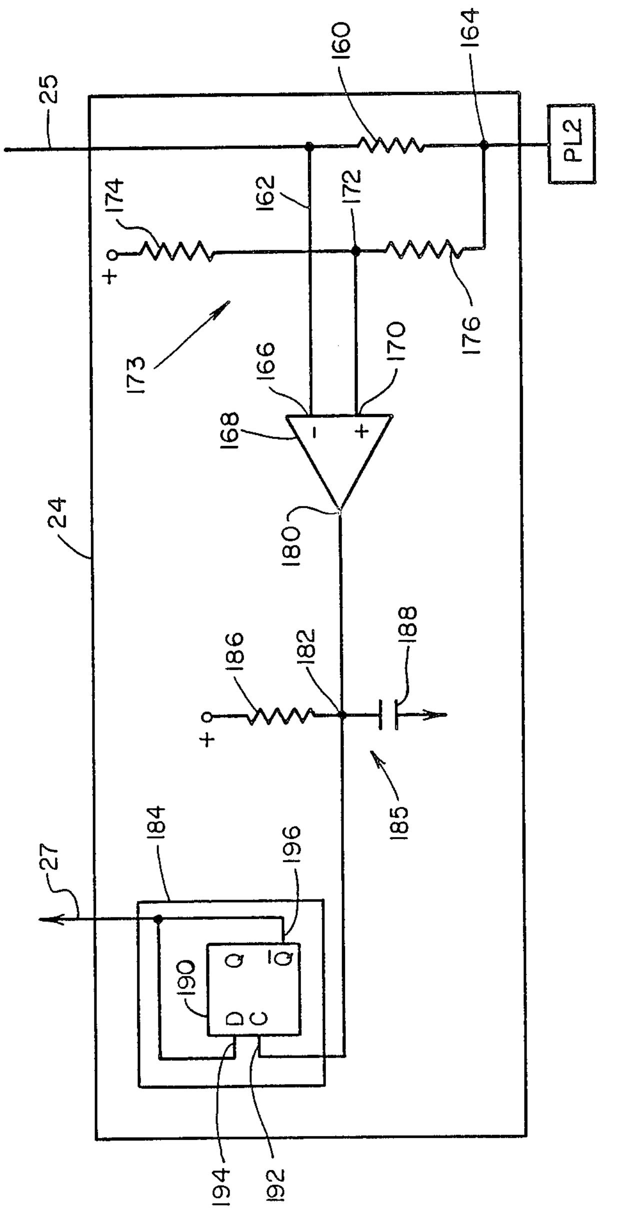
FIG. 6 is a circuit diagram depicting one possible embodiment of the detector circuit means of the present invention.

It will also be appreciated that the detector circuit means 24 of the present invention, the operation of which has been described hereinbefore in rather general terms, may take many forms. FIG. 6 depicts a detailed embodiment of one relatively simple detector circuit means 24 that could be employed with the present invention. The detector circuit means, as shown, includes resistor 160, one side of which is connected both to lead 25 and to a monitor lead 162, and the other side of which is connected through node 164 to power lead PL2. Monitor lead 162 is connected to the negative (−) input 166 of comparison means 168, which preferably is a voltage comparator such as might be found on an LM339 chip, the positive (+) input 170 of which comparison means 168 is connected to node 172 of a voltage divider network 173 that includes resistor 174, node 172, and resistor 176 connected in series circuit between a positive voltage source and node 164, which node is operatively connected to power lead PL2. The output 180 of such comparison means 168, which output 180 is shown connected through node 182 to signal generation means 184, is normally maintained HI by a pull-up circuit 185 that includes resistor 186, node 182, and capacitor 188 connected in series between a positive voltage source and ground.

In practice, comparison means 168 functions in such a manner that whenever the voltage level present at the negative input is greater than the voltage level present at the positive input, a logical LO output results. When the voltage level present at the negative input is less than the voltage level present at the positive input, a logical HI is present at the output.

It will be readily understood by those skilled in the art that the components of the voltage divider network 173 connected to positive (+) input 170 of comparison means 168 can be easily varied to establish a desired voltage level at the positive input 170. For the purposes of later reference herein the voltage established at such input terminal by means of the divider network will hereinafter be referred to as the reference point voltage, which voltage is selected to be less than the voltage drop across resistor 160 when a motor drive circuit is established through a given motor.

In operation, prior to the establishment of a motor drive circuit through a given motor, no circuit will be completed through resistor 160 and the reference point voltage will therefore be greater than the voltage drop across resistor 160, as a consequence of which output 180 of comparison means 168 will therefore be held HI by the pull-up circuit 185. Thereafter, when a motor drive circuit is subsequently established through a given motor, the voltage drop across resistor 160 will exceed the reference point voltage and the output 180 of comparison means 168 will be driven LO and will so remain until a momentary interruption of the motor drive circuit occurs due to the movement of the movable contact of the cam operated switch means associated with the energized motor from its first pole to its second pole. Upon such momentary circuit interruption the reference point voltage will briefly exceed the voltage drop across resistor 160 and the output 180 will therefore be pulled back HI for a brief period until the motor drive circuit is re-established as the movable contact completes its movement into contact with the second pole of the cam operated switch means, at which time the output 180 will again be driven LO. As the energized motor continues to operate the movable contact of the associated cam operated switch means will thereafter be caused to move from the second pole back to the first pole, as a consequence of which the output 180 of the comparison will again be momentarily pulled HI during the interruption of the motor drive circuit.

From the foregoing, it will be appreciated that, with the comparison means depicted in FIG. 6, two positive going signals will be produced at output 180 of comparison means 168 during each complete cycle of a given energized motor. However, in many instances it is desired to provide to vend control means 12 only a single signal which is intended to represent detection of the return of such energized motor to a home position. Signal generation means 184 is therefore provided in the FIG. 6 embodiment to receive the two positive going signals produced at the output 180 of comparison means 168 during a motor operation cycle, and to be responsive thereto to produce a home detection signal on lead 27 only upon the occurrence of such second positive going signal, which signal is produced at output 180 of comparison means 168 when the movable contact of the cam operated switch means associated with the energized motor returns from its second pole to its first pole. Many different means and circuits could be employed to accomplish such purpose, one of which is depicted in greater detail in FIG. 6.

The signal generation means of FIG. 6 is depicted as including a D type flip-flop 190, the C (clock) input 192 of which is connected through node 182 to output 180 of comparison means 168 to receive the signals produced thereat, and the $\overline{Q}$ output 196 of which is connected to lead 27 and also back to the D (data) input 194 of such flip-flop. If the flip-flop is initially in a reset state, the first positive going signal at output 180 will clock the flip-flop causing it to set and the second positive going signal output 180 will clock the flip-flop causing it to reset. In accordance therewith, a HI signal will be produced on lead 27 only when the flip-flop is reset in response to the momentary interruption of the motor drive circuit occasioned by the movement of the movable contact of the cam operated switch means from its second pole to its first pole.

It should also be appreciated that signal generation means 184 need not be employed with all vend systems. Some vend systems, especially those that include microprocessors as part of their controller means, may be so constructed or programmed to be directly responsive only to every second signal produced by a comparison means such as comparison means 168. Such systems would therefore not require a signal producing means such as signal producing means 184. Consequently, whether or not multiple signals are produced by the detector circuit means required by the present invention will be determined by the particular vend control means utilized in any vend system. In any event, though, the home detection signal provided to the vend control means will be that signal produced by the detector circuit means in response to the movement of the movable contact of the cam operated switch means associated with the particular motor energized from its second pole back to its first pole.

It should be noted that, although the subject invention has been discussed and described with reference to a plurality of vend motors, it may be employed equally as well with any plurality of motors that are selectively individually actuatable to perform a given type of operation.

Thus, there has been shown and described a novel operation completion detection means which fulfills the various objects and advantages sought therefor. It will be apparent to those skilled in the art, however, that many changes, modifications, variations, and other uses and applications of the subject means are possible, and all such changes, modifications, variations, and other uses and applications which do not depart from the spirit and scope of the invention are deemed to be covered by the invention, which is limited only by the claims which follow.

What is claimed is:

1. Operation completion detection means for a vend system including one or more individually controllably operable motors for performing a given type of operation, said operation completion detection means comprising power leads, vend control means including means for completing a circuit across said power leads through a given motor, cam operated switch means associated with and connected in series circuit with each motor, each cam operated switch means including first and second poles and a controllably movable contact normally in electrical contact with said first pole and responsive to operation of the motor with which such cam operated switch means is associated to switchably cycle between said poles during a complete operational cycle of such motor, said first and second poles being connected in common, and a detector circuit means having a monitor portion thereof operatively connected in common circuit to all of such motors and their associated cam operated switch means and in series circuit with each respective motor and its associated cam operated switch means, said vend control means being operable to effect the establishment of a power drive circuit to a given motor and its associated cam operated switch means and to thereby complete a motor driving circuit through said given motor and its associated cam operated switch means, such motor driving circuit initially comprising a first power circuit through said given motor and through the movable contact and first pole of the cam operated switch means associated therewith, the completion of said first power circuit initiates operation and the commencement of an operational cycle of such given motor, operation of such given motor thereafter effecting switchable movement of said movable contact of said associated cam operated switch means from said first pole to said second pole to break said first power circuit and to establish a second power circuit through such given motor and the movable contact and second pole of said associated cam operated switch means, whereupon said motor driving circuit comprises said second power circuit, further operation of such given motor effecting switchable movement of said movable contact from said second pole back to said first pole to break said second power circuit and to re-establish said first power circuit through such given motor and through the movable contact and first pole of the cam operated switch means associated therewith, whereupon said motor driving circuit again comprises said first power circuit, said switchable movement of said movable contact from said second pole to said first pole momentarily interrupting the motor driving circuit through said given motor and its associated cam operated switch means, said momentary circuit interruption of said motor driving circuit upon the movement of said movable contact from said second to said first pole being detectible by said detector circuit means, said detector circuit means responsive to said momentary circuit interruption upon the movement of said movable contact from said second to said first pole to produce a home detection signal, said vend control means operatively connected to receive said home detection signal and responsive thereto to effect disestablishment of said power drive circuit to said given motor and its associated cam operated switch means.

2. The operation completion detection means of claim 1 wherein said detector circuit means includes a comparison means having a first input operatively connected to a reference voltage source, a second input operatively connected to said monitor portion of said detector circuit means, and an output, said comparison means responsive to said momentary circuit interruption upon the movement of said movable contact from said second pole to said first pole to produce a circuit interruption detection signal at said output of said comparison means, said home detection signal produced by said detector circuit means corresponding to said detection signal produced at said output of said comparison means.

3. The operation completion detection means of claim 1 wherein said switchable movement of said movable contact from said first pole to said second pole momentarily interrupts the motor driving circuit through said given motor and its associated cam operated switch means, said momentary circuit interruption of said motor driving circuit upon the movement of said movable contact from said first to said second pole being detectible by said detector circuit means.

4. The operation completion detection means of claim 3 wherein said detector circuit means includes a comparison means having a first input operatively connected to a reference voltage source, a second input operatively connected to said monitor portion of said detector circuit means, and an output, said comparison means responsive to said momentary circuit interruptions to produce circuit interruption detection signals at said output of said comparison means, and wherein said detector circuit means further includes a signal generation means connected to receive said circuit interruption detection signals and to produce said home detection signal upon receipt of the circuit interruption detection signal effected by the momentary circuit interruption upon the movement of said movable contact from said second pole to said first pole.

5. The operation completion detection means of claim 4 wherein said signal generation means includes a flip-flop responsive to a first circuit interruption detection signal effected by the momentary circuit interruption upon the movement of said movable contact from said first pole to said second pole to establish a first output state of said flip-flop and responsive to a second circuit interruption detection signal effected by the momentary circuit interruption upon the movement of said movable contact from said second pole to said first pole to establish a second output state of said flip-flop.

6. The operation completion detection means of claim 4 wherein said vend control means includes a microprocessor operatively connected to receive said circuit interruption detection signals and programmed to be responsive to receipt of the circuit interruption detection signal efforted by the momentary circuit interruption upon the movement of said movable contact from said second pole to said first pole to effect disestablishment of said power drive circuit to said given motor and its associated cam operated switch means.

7. The operation completion detection means of claim 3 wherein said detector circuit means is responsive to said momentary circuit interruptions to produce said home detection signal only upon the movement of said movable contact of said associated cam operated switch means from said second pole to said first pole.

8. The operation completion detection means of claim 1 wherein said detector circuit means includes a second portion under control of said monitor portion and operable to produce said home detection signal.

* * * * *